(12) United States Patent
Bour et al.

(10) Patent No.: US 9,376,885 B2
(45) Date of Patent: Jun. 28, 2016

(54) ENHANCED GEOTHERMAL SYSTEMS AND RESERVOIR OPTIMIZATION

(71) Applicant: AltaRock Energy, Inc., Seattle, WA (US)

(72) Inventors: Daniel Bour, Granite Falls, WA (US); Susan Petty, Shoreline, WA (US)

(73) Assignee: AltaRock Energy, Inc., Seattle, WA (US)

( * ) Notice: Subject to any disclaimer, the term of this patent is extended or adjusted under 35 U.S.C. 154(b) by 250 days.

(21) Appl. No.: 14/142,289

(22) Filed: Dec. 27, 2013

(65) Prior Publication Data

US 2014/0110107 A1 Apr. 24, 2014

Related U.S. Application Data

(63) Continuation of application No. 13/603,410, filed on Sep. 4, 2012, now Pat. No. 8,640,772, which is a continuation of application No. 12/499,012, filed on Jul. 7, 2009, now Pat. No. 8,272,437.

(60) Provisional application No. 61/078,682, filed on Jul. 7, 2008, provisional application No. 61/078,686, filed on Jul. 7, 2008, provisional application No. 61/087,332, filed on Aug. 8, 2008, provisional application No. 61/087,342, filed on Aug. 8, 2008, provisional application No. 61/102,644, filed on Oct. 3, 2008, provisional application No. 61/154,077, filed on Feb. 20, 2009.

(51) Int. Cl.
| | | |
|---|---|---|
| E21B 43/26 | (2006.01) |
| E21B 33/12 | (2006.01) |
| E21B 33/124 | (2006.01) |
| F24J 3/08 | (2006.01) |

(52) U.S. Cl.
CPC ............... *E21B 33/124* (2013.01); *E21B 43/26* (2013.01); *F24J 3/085* (2013.01); *Y02E 10/14* (2013.01)

(58) Field of Classification Search
CPC .... E21B 33/124; E21B 33/1243; E21B 43/26
See application file for complete search history.

(56) References Cited

U.S. PATENT DOCUMENTS

| | | |
|---|---|---|
| 2,788,072 A | 4/1957 | Goodwin |
| 3,195,630 A | 7/1965 | Fisher |
| 3,390,723 A | 7/1968 | Hower et al. |

(Continued)

FOREIGN PATENT DOCUMENTS

| | | |
|---|---|---|
| DE | 3925337 A1 | 2/1991 |
| EP | 338154 A1 | 10/1989 |

(Continued)

OTHER PUBLICATIONS

Examination Report for European Patent Application No. 09 790 118.5 dated Feb. 22, 2013.

(Continued)

*Primary Examiner* — Catherine Loikith
(74) *Attorney, Agent, or Firm* — Thorpe North & Western, LLP

(57) ABSTRACT

Systems and methods can include maximizing energy recovery from a subterranean formation. According to one embodiment, a selected subterranean open-hole interval is isolated and at least one fracture is stimulated in the isolated subterranean open-hole interval.

15 Claims, 10 Drawing Sheets

(56) References Cited

U.S. PATENT DOCUMENTS

| | | |
|---|---|---|
| 3,526,097 A | 9/1970 | Nelson |
| 3,942,101 A | 3/1976 | Sayer et al. |
| 3,960,736 A | 6/1976 | Free et al. |
| 4,055,399 A | 10/1977 | Parrish |
| 4,126,406 A | 11/1978 | Traylor et al. |
| 4,223,729 A | 9/1980 | Foster |
| 4,520,666 A | 6/1985 | Coblentz et al. |
| 4,559,818 A | 12/1985 | Tsang et al. |
| 4,573,537 A | 3/1986 | Hirasuna |
| 4,577,679 A | 3/1986 | Hibshman |
| 4,716,964 A | 1/1988 | Erbstoesser et al. |
| 4,749,035 A | 6/1988 | Cassity |
| 4,832,121 A | 5/1989 | Anderson |
| 4,926,949 A | 5/1990 | Forrest |
| 4,976,142 A | 12/1990 | Perales |
| 5,143,155 A | 9/1992 | Ferris et al. |
| 5,163,321 A | 11/1992 | Perales |
| 5,165,235 A | 11/1992 | Nitschke |
| 5,246,860 A | 9/1993 | Hutchins et al. |
| 5,503,225 A | 4/1996 | Withers |
| 5,515,679 A | 5/1996 | Shulman |
| 5,595,245 A | 1/1997 | Scott, III |
| 5,723,781 A | 3/1998 | Pruett et al. |
| 5,890,536 A | 4/1999 | Nierode et al. |
| 5,931,000 A | 8/1999 | Turner et al. |
| 5,944,446 A | 8/1999 | Hocking |
| 6,016,191 A | 1/2000 | Ramos et al. |
| 6,125,934 A | 10/2000 | Lenn et al. |
| 6,291,404 B2 | 9/2001 | House |
| 6,659,175 B2 | 12/2003 | Malone et al. |
| 6,758,271 B1 | 7/2004 | Smith |
| 7,032,662 B2 | 4/2006 | Malone et al. |
| 7,207,389 B2 | 4/2007 | Foster et al. |
| 7,265,079 B2 | 9/2007 | Willberg et al. |
| 7,296,625 B2 | 11/2007 | East, Jr. |
| 7,299,873 B2 | 11/2007 | Hartman et al. |
| 7,347,260 B2 | 3/2008 | Ferguson et al. |
| 7,353,876 B2 | 4/2008 | Savery et al. |
| 7,403,404 B2 | 7/2008 | Oka et al. |
| 7,523,024 B2 | 4/2009 | Endres et al. |
| 7,565,929 B2 | 7/2009 | Bustos et al. |
| 7,909,096 B2 | 3/2011 | Clark et al. |
| 7,967,069 B2 | 6/2011 | Beasley |
| 8,272,437 B2 | 9/2012 | Bour et al. |
| 2002/0007949 A1 | 1/2002 | Tolman et al. |
| 2003/0051876 A1 | 3/2003 | Tolman et al. |
| 2003/0079877 A1 | 5/2003 | Wellington et al. |
| 2004/0074642 A1 | 4/2004 | Price-Smith et al. |
| 2006/0113077 A1 | 6/2006 | Willberg et al. |
| 2006/0169452 A1 | 8/2006 | Savery et al. |
| 2007/0083331 A1 | 4/2007 | Craig et al. |
| 2007/0223999 A1 | 9/2007 | Curlett |
| 2007/0272407 A1 | 11/2007 | Lehman et al. |
| 2008/0026956 A1 | 1/2008 | Shinbach et al. |
| 2008/0083536 A1 | 4/2008 | Cavender et al. |
| 2008/0128108 A1 | 6/2008 | Clark |
| 2008/0210423 A1 | 9/2008 | Boney |
| 2008/0236823 A1 | 10/2008 | Willberg et al. |
| 2009/0037112 A1 | 2/2009 | Soliman et al. |
| 2009/0065253 A1 | 3/2009 | Suarez-Rivera et al. |

FOREIGN PATENT DOCUMENTS

| | | |
|---|---|---|
| EP | 357317 A | 3/1990 |
| EP | 435430 A1 | 7/1991 |
| EP | 1980604 A | 10/2008 |
| GB | 2288694 A | 10/1995 |
| WO | WO 99/05394 A | 2/1999 |
| WO | WO 2004/076815 A | 9/2004 |
| WO | WO 2005/001242 A2 | 1/2005 |
| WO | WO 2006/002325 A2 | 1/2006 |
| WO | WO 2008/064074 | 5/2008 |
| WO | WO 2008/107831 A2 | 9/2008 |
| WO | WO 2008/122114 | 10/2008 |
| WO | WO 2008/156970 | 12/2008 |

OTHER PUBLICATIONS

Examination Report for European Patent Application No. 09 790 118.5 dated Mar. 17, 2014.
PCT/US2010/038420—Search Report dated Aug. 18, 2010.
PCT/US2010/036969—Search Report dated Jul. 21, 2010.
PCT/US2009/042421—Search Report dated Sep. 14, 2009.
PCT/US2009/042137—Search Report dated Aug. 21, 2009.
PCT/US2009/053304—Search Report dated Mar. 11, 2009.
PCT/US2010/030013—Search Report dated Jun. 7, 2010.
PCT/US2009/054536—Search Report dated Nov. 18, 2009.
PCT/US2009/049844—Search Report dated Dec. 17, 2009.

ENHANCED GEOTHERMAL SYSTEMS AND RESERVOIR OPTIMIZATION

CROSS REFERENCE TO RELATED APPLICATIONS

This application is a continuation of and claims priority to U.S. application Ser. No. 13/603,410, entitled "ENHANCED GEOTHERMAL SYSTEMS AND RESERVOIR OPTIMIZATION" filed on Sep. 4, 2012, which is a continuation of and claims priority to U.S. application Ser. No. 12/499,012, entitled "ENHANCED GEOTHERMAL SYSTEMS AND RESERVOIR OPTIMIZATION" filed on Jul. 7, 2009, which claims the benefit of and priority to U.S. Provisional Application No. 61/078,682, entitled "SYSTEM AND METHOD FOR USING A DRILLABLE AND RETRIEVABLE HIGH TEMPERATURE PACKER TO ISOLATE ZONES IN A GEOTHERMAL RESERVOIR" filed on Jul. 7, 2008; U.S. Provisional Application No. 61/078,686, entitled "SYSTEM AND METHOD FOR USE OF AN EXPANDABLE TUBULAR TO SET A PACKER IN WELLBORES TO ISOLATE ZONES" filed on Jul. 7, 2008; U.S. Provisional Application No. 61/087,332, entitled "ENHANCED GEOTHERMAL SYSTEM, AND RESERVOIR OPTIMIZATION," filed on Aug. 8, 2008; U.S. Provisional Application No. 61/087,342, entitled "OPEN HOLE SCAB LINER FOR MULTIPLE ZONE EGS STIMULATION"filed on Aug. 8, 2008; U.S, Provisional Application No. 61/102,644, entitled "TEMPORARY BLOCKING AGENT FOR IMPROVEMENT IN CREATION OF AN EGS RESERVOIR" filed on Oct. 3, 2008; and U.S. Provisional Application No. 61/154,077, entitled "THERMALLY DECOMPOSING MATERIALS FOR USE AS A TEMPORARY BLOCKING AGENT" filed on Feb. 20, 2009, which are all incorporated by reference in their entirety, for all purposes, herein.

FIELD

The present application is directed to systems and methods for maximizing energy recovery from a subterranean formation.

BACKGROUND

The creation of an Enhanced Geothermal Systems (EEGS) reservoir involves fracturing a subterranean formation or a plurality of subterranean formations. Water is circulated from an injection well, through the fractures where it is heated. The hot water or heat from the formation is produced from one or more production wells some distance away from the injection well and used for generating electricity. Fractures within subterranean formations are typically created in an un-cased or open-hole environment by pumping water from the surface down into the well. Water pressure opens a network of fractures in the open-hole section of the subterranean formation having the lowest fracture initiation pressure. The fracture network propagates away from the wellbore in a specific orientation that is related to existing stresses in the subterranean formation. However, a relatively small section of the open-hole section of the subterranean formation is actually fractured. Other locations in the open-hole section having higher fracture initiation pressures that are typically deeper in the subterranean formation remain unstimulated. Unstimulated regions within the subterranean formation are an untapped source of energy for power generation and the efficiency of power generation on a per well basis remains relatively low. The cost of drilling and completing wells can range from half to 80 percent of the total cost of an EGS project, Therefore, reducing the number of wells for a given project can have a significant impact on the overall cost of the project and ultimately the cost of power production.

SUMMARY

Systems and methods for maximizing energy recovery from a subterranean formation are herein disclosed. A selected subterranean open-hole interval is isolated and at least one fracture is stimulated in the isolated subterranean open-hole interval.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein.

DETAILED DESCRIPTION

Figure 1:
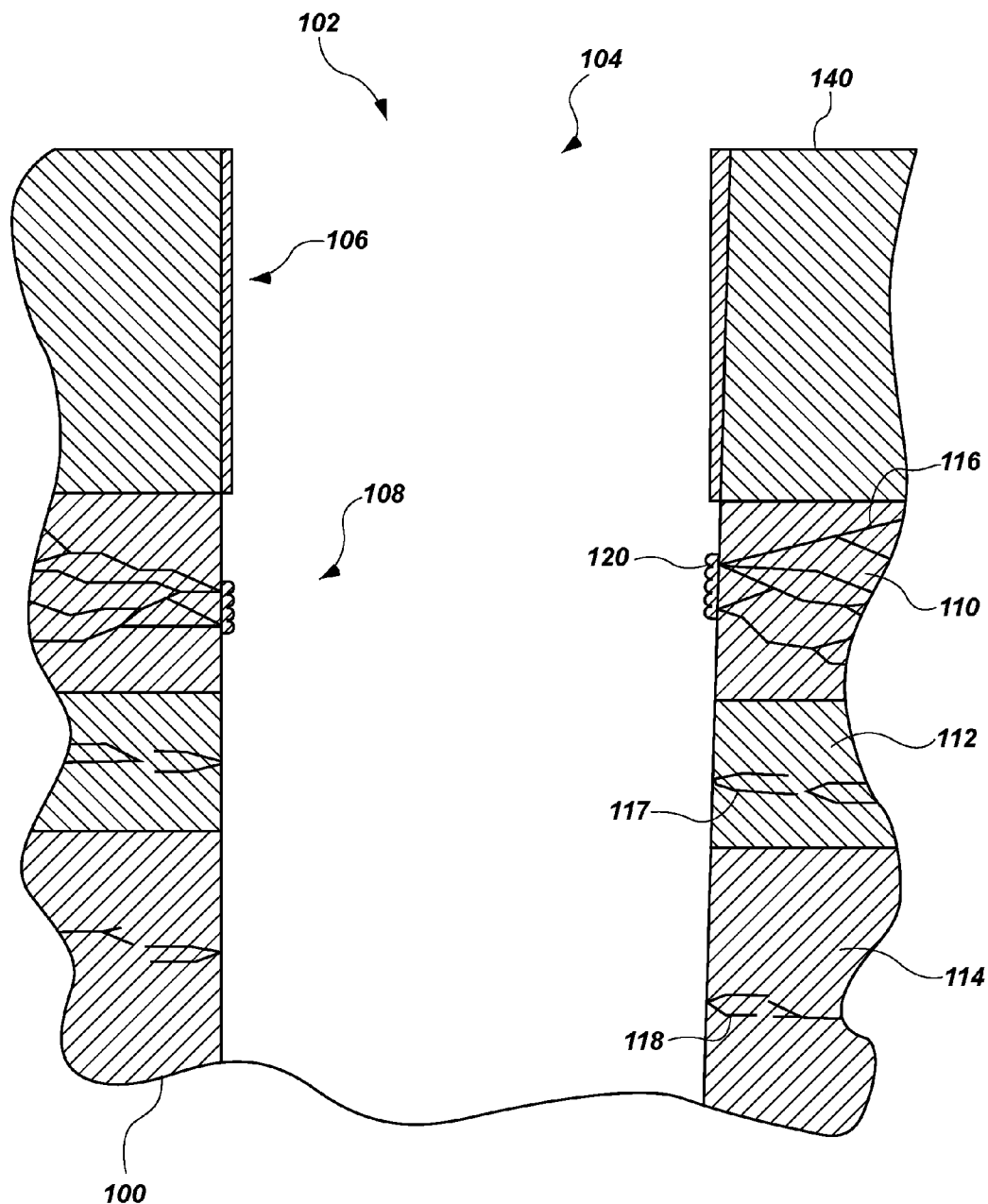
FIG. 1 illustrates an exemplary method for maximizing energy recovery from a subterranean formation according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may he practiced without these specific details. In other instances, methods, procedures arid components have not been described in detail so as not to obscure the embodiments described herein. It will be understood by those of ordinary skill in the art that the systems and methods herein disclosed may be applied to subterranean wells including, but not limited to, geothermal wells, oil wells, gas wells, water wells, injection wells or any other well known in the art for producing or injecting fluids.

FIG. 1 illustrates an exemplary method for maximizing energy recovery from a subterranean formation 100 according to one embodiment. A subterranean well 102 including a wellbore 104 is drilled in a subterranean formation 100. The subterranean well 102 includes a cased section 106 and an open-hole section 108 extending below the cased section 106. The cased section 106 of the subterranean well 102 is lined with casing. The open-hole section 108 includes a plurality of open-hole intervals 110, 112, 114 located at increasing subterranean depths. Treatment fluid is injected or pumped into the wellbore 104 to pressurize the open-hole section 108 of the subterranean well 102. Pressure created by injected treatment fluid stimulates a fracture or a fracture network 116 by opening factures within an unisolated open-hole interval 110. Treatment fluid for simulating fractures may comprise water, brine, or any fluid known in the art that is capable of stimulating fractures and compatible with other fluids in the subterranean well 102.

Fractures 116 in an open-hole interval 110 that is closer to the surface 140 typically have lower fracture initiation pressures than fractures 117, 118 in open-hole intervals 112, 114 that are located at greater subterranean depths. Fractures 117, 118 in open-hole intervals 112, 114 located at greater subterranean depths and having higher fracture initiation pressures may remain unstimulated during stimulation of fractures 116 with lower fracture initiation pressures, To maximize energy recovery from the subterranean formation 100, a temporary fracture sealant 120 is injected into stimulated fractures 116 and/or against the fracture face to isolate open-hole intervals having higher fracture initiation pressures. The temporary fracture sealant may comprise a substrate of solid particles suspended in an aqueous suspension. The temporary fracture sealant 120 may thermally degrade, degrade after a predetermined period of time, or degrade in the presence of another chemical composition. The temporary fracture sealant may also be an acid soluble cement or other cement system that may degrade after a predetermined period of time or degrade when exposed to acid such as hydrochloric acid. It is advantageous to use a temporary fracture sealant 120 for isolating a plurality of open-hole intervals because a drilling rig and the associated cost are not required for injection during fracture stimulation. The temporary fracture sealant 120 temporarily seals at least a portion of stimulated fractures 116 and/or at least a portion of the fracture face penetrating the wellbore 104.

In an example embodiment the temporary fracture sealant 120 comprises a substrate of solid polylactic acid particles suspended in a carrier fluid. The well is typically cooled significantly during the fracture stimulation treatment from the injection of surface temperature water. The temporary fracture sealant 120 remains intact for predetermined period of time and under a predetermined temperature during fracture stimulation. The temporary fracture sealant 120 degrades into lactic acid as the subterranean well 102 heats back up to geostatic temperature after fracture stimulation is complete.

After sealing stimulated fractures 116 in an unisolated open-hole interval 110, additional treatment fluid may be injected into the open-hole section 108 of the wellbore 104 to pressurize one or more isolated open-hole intervals 112, 114 containing unstimulated fractures 117, 118. Pressure created by the injected fluid opens or stimulates unstimulated fractures 117, 118 having higher fracture initiation pressures within one or more isolated open-hole intervals 112, 114 without propagation of stimulated fractures 116 that are sealed with the temporary fracture sealant 120. Fractures having the lowest initiation pressure are stimulated first and subsequently sealed with temporary fracture sealant 120. Stimulated fractures in selected open-hole intervals may be sealed with temporary fracture sealant 120 and unstimulated fractures in isolated open-hole intervals may be stimulated in order of increasing subterranean depth or in order of decreasing subterranean depth.

In an example embodiment, the temporary fracture sealant 120 comprises a substrate of solid sodium chloride particles coated with a thermally degradable wax. The particles of sodium chloride within the substrate are ground to a particle size between 100 to 1500 microns. The thermally degradable wax coating is designed to decompose or melt at a predetermined temperature, which is typically between the well temperature during fracture stimulation and the geostatic temperature. The temporary fracture sealant 120 is suspended in an aqueous suspension comprising a carrier fluid of water. A gel may be added to the aqueous suspension to increase the viscosity of the aqueous suspension and to maintain suspension of the temporary fracture sealant 120. The aqueous suspension may be injected into the wellbore 104 to temporarily seal at least a portion of stimulated fractures 116 and/or at least a portion of the fracture face penetrating the wellbore 104. After stimulation of a plurality of open-hole intervals 110, 112, 114, the wellbore 104 may be allowed to heat back up towards geostatic temperature to decompose or melt the thermally degradable wax coating and expose the substrate of solid sodium chloride particles. Fluid such as water within the subterranean well 102 will dissolve the substrate of solid sodium chloride particles to expose stimulated fractures within a plurality of open-hole intervals 110, 112, 114. Heated fluid such as water may also be injected into the subterranean well 102 to decompose or melt the thermally degradable wax coating and dissolve the substrate of solid sodium chloride particles.

Figure 2:
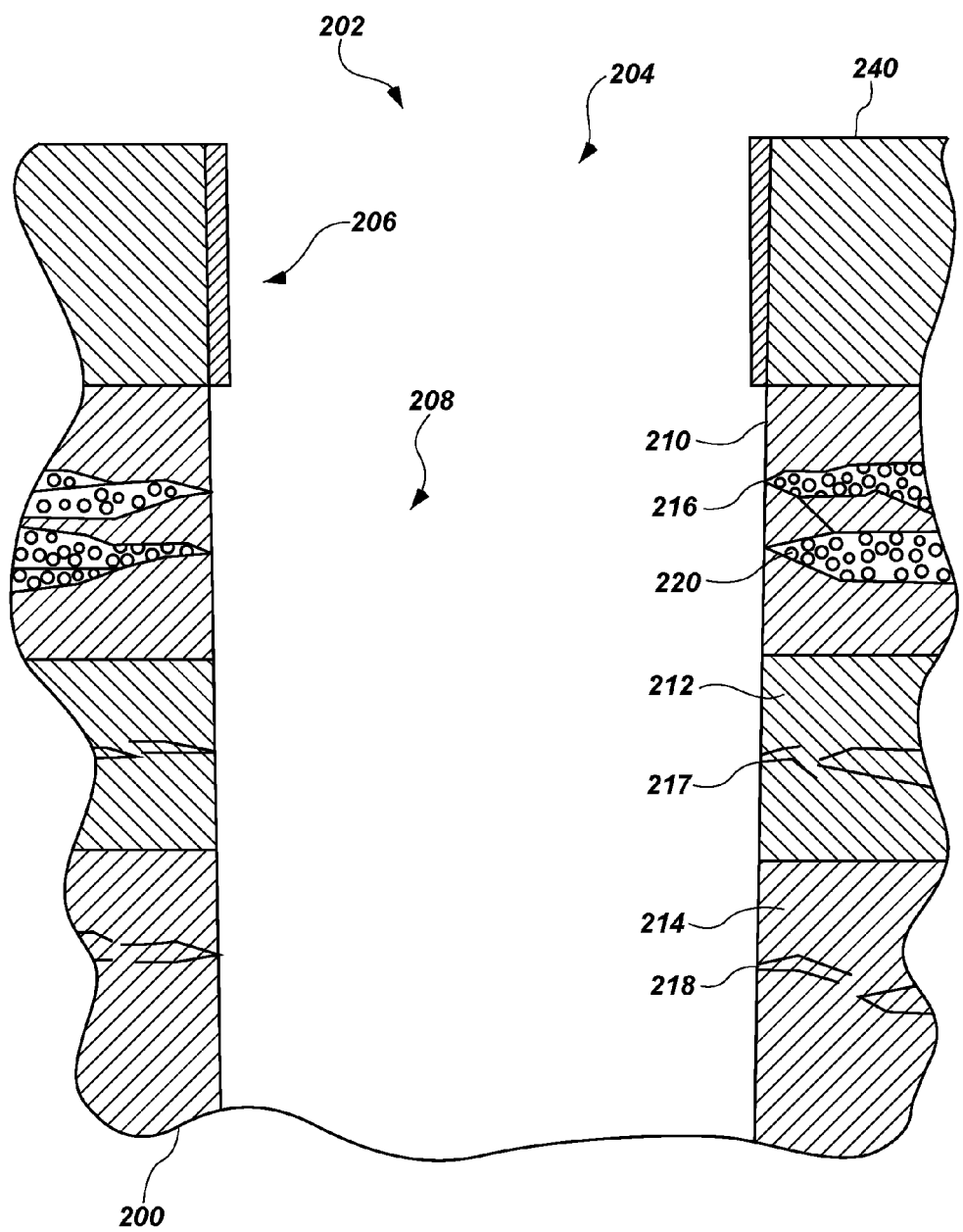
FiG. 2 illustrates an exemplary method for maximizing energy recovery from a subterranean formation according to another embodiment.

FIG. 2 illustrates an exemplary method for maximizing energy recovery from a subterranean formation 200 according to another embodiment. A subterranean well 202 including a wellbore 204 is drilled in a subterranean formation 200. The subterranean well 202 includes a cased section 206 and an open-hole section 208 extending below the cased section 206. The cased section 206 of the subterranean well is lined with casing. The open-hole section 208 includes a plurality of open-hole intervals 210, 212, 214 located at increasing subterranean depths. Treatment fluid is injected or pumped into the wellbore 204 to pressurize the open-hole section 208 of the subterranean well 202. Pressure created by injected treatment fluid stimulates a fracture or a fracture network 216 by opening fractures within an unisolated open-hole interval 210. Treatment fluid may comprise water, brine, or any fluid known in the art that is capable of stimulating fractures and compatible with other fluids in the subterranean well 202. Fractures 216 in an open-hole interval 210 that is closer to the surface 240 typically have lower fracture initiation pressures than fractures 217, 218 in open-hole intervals 212, 214 that are located at greater subterranean depths. Fractures 217, 218 in open-hole intervals 212, 214 located at greater subterranean depths and having higher fracture initiation pressures may remain unstimulated during stimulation of fractures 216 with lower fracture initiation pressures.

To maximize energy recovery from the subterranean formation 100, a high viscosity fluid 220 is injected into stimulated fractures 216 in an unisolated open-hole interval 210. It is advantageous to use a high viscosity fluid for isolating a plurality of open-hole intervals, because a drill rig is not required for injection. Stimulated fractures 216 may be partially or substantially filled with the high viscosity fluid 220. The high viscosity fluid 220 may be a foamed fluid including, but not limited to, a stiff foamed fluid comprising thermally stable detergents, entrained gases and a base liquid. The base liquid may be a low viscosity fluid like water or a high viscosity fluid comprising water and some other viscosifying agent. The high viscosity fluid 220 may also be a liquid-based fluid comprising additives, including but not limited, to gel systems, particulates, etc. The composition of the high viscosity fluid 220 may be designed to decrease in viscosity with an increase in time and/or temperature. The high viscosity fluid 220 creates pressure resistance within stimulated fractures 216 or blocks the stimulated fractures 216 to isolate one or more selected open-hole intervals 212, 214 for fracture stimulation.

After stimulated fractures 216 are blocked with high viscosity fluid 220, additional treatment fluid or additional high viscosity fluid 220 may be injected into the open-hole section 208 of the wellbore 204 to pressurize one or more isolated open-hole intervals 212, 214 containing unstimulated fractures 217, 218. Pressure created by injected fluid opens unstimulated fractures 217, 218 having higher fracture initiation pressures within one or more isolated open-hole intervals 212, 214 without propagation of stimulated fractures 216 that are blocked with high viscosity fluid 220. Fractures having the lowest initiation pressure are stimulated first and subsequently blocked with high viscosity fluid 220. Stimulated fractures in selected open-hole intervals may be blocked with high viscosity fluid 220 and unstimulated fractures in isolated open-hole intervals may be stimulated in order of increasing subterranean depth or in order of decreasing subterranean depth.

The injection of treatment fluid or high viscosity fluid 220 cools the wellbore 204. After stimulation of a plurality of open-hole intervals 210, 212, 214, the wellbore 204 may be allowed to heat back up towards geostatic temperature. The increase in temperature may decrease the viscosity of the high viscosity fluid 220 to allow for removal of the high viscosity fluid 220 from stimulated fractures. The high viscosity fluid 220 may also comprise internal chemical breakers that reduce the viscosity after a predetermined period of time to allow for removal of the high viscosity fluid 220 from stimulated fractures. The high viscosity fluid 220 may also be removed from stimulated fractures by naturally producing the high viscosity fluid 220 from the subterranean well 202 or producing the high viscosity fluid 220 after decreasing the pressure of the subterranean well 202.

Figure 3:
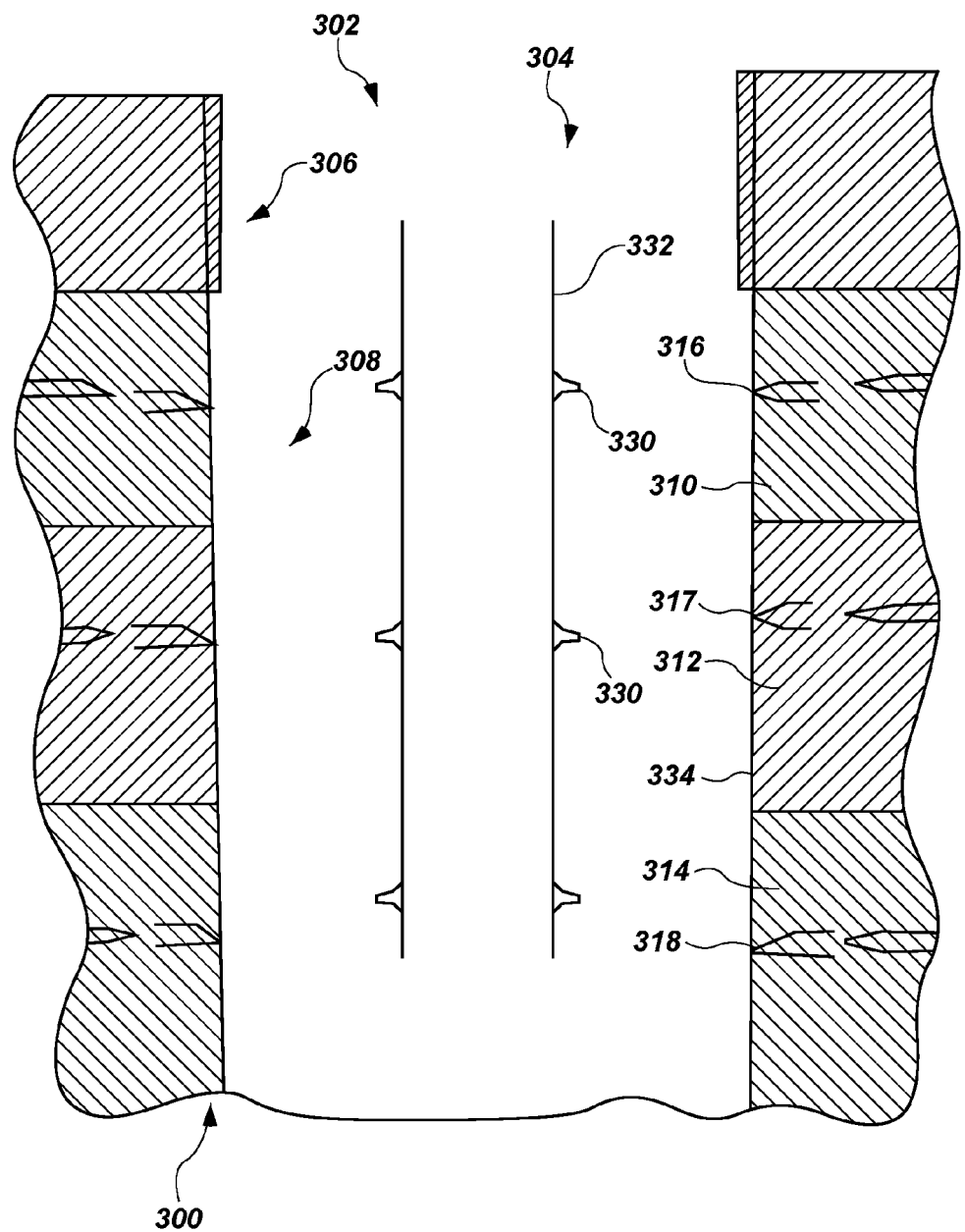
FIG. 3 illustrates an exemplary method for maximizing energy recovery from a subterranean formation according to another embodiment.

FIG. 3 illustrates an exemplary method for maximizing energy recovery from a subterranean formation 300 according to another embodiment. A subterranean well 302 including a wellbore 304 is drilled in a subterranean formation 300. The wellbore 304 includes a cased section 306 and an open-hole section 308 extending below the cased section 306. The cased section 306 of the wellbore 304 is lined with casing. The open-hole section 308 includes a plurality of open-hole intervals 310, 312, 314 located at increasing subterranean depths. To maximize energy recovery from the subterranean formation 300, unstimulated fractures 316, 317, 318 within a plurality of subterranean intervals 310, 312, 314 are simulated by projecting treatment fluid against the wellbore wall 334 at a pressure sufficient to stimulate a fracture or fracture network. Treatment fluid may be projected against the wellbore wall 334 within one or more unisolated or isolated open-hole intervals 310, 312, 314 through high pressure jet nozzles 330 arranged along a tubing string 332. The tubing string 332 may be coiled tubing, concentric coil tubing or threaded jointed tubing. Treatment fluid projected from at least one high pressure jet nozzle 330 creates an isolated pocket of high pressure adjacent to the high pressure jet nozzle 330 in one or more unisolated or isolated open-hole intervals 310, 312, 314 without an increase in pressure in the remainder of the subterranean well 302. The isolated pocket of high pressure opens unstimulated fractures 316, 317, 318 to create stimulated fractures adjacent to the high pressure jet nozzle 330. Additional treatment fluid may be injected or pumped down the annulus between the outside diameter of the tubing string 332 and the wellbore wall 334 to obtain higher fluid injection rates. High strength granular material may be added to the treatment fluid to further erode the subterranean formation 300 and stimulate fractures therein. The tubing string 332 may be moved up and down the subterranean well 302 to stimulate a plurality of fractures or fracture networks within a plurality of subterranean intervals 310, 312, 314 located at varying subterranean depths. Treatment fluid may be projected against the wellbore wall 334 within one or more unisolated or isolated open-hole intervals to stimulate fractures in order of decreasing or increasing subterranean depth. Treatment fluid may also be projected from other hydro-jetting tools known in the art.

Figure 4A:
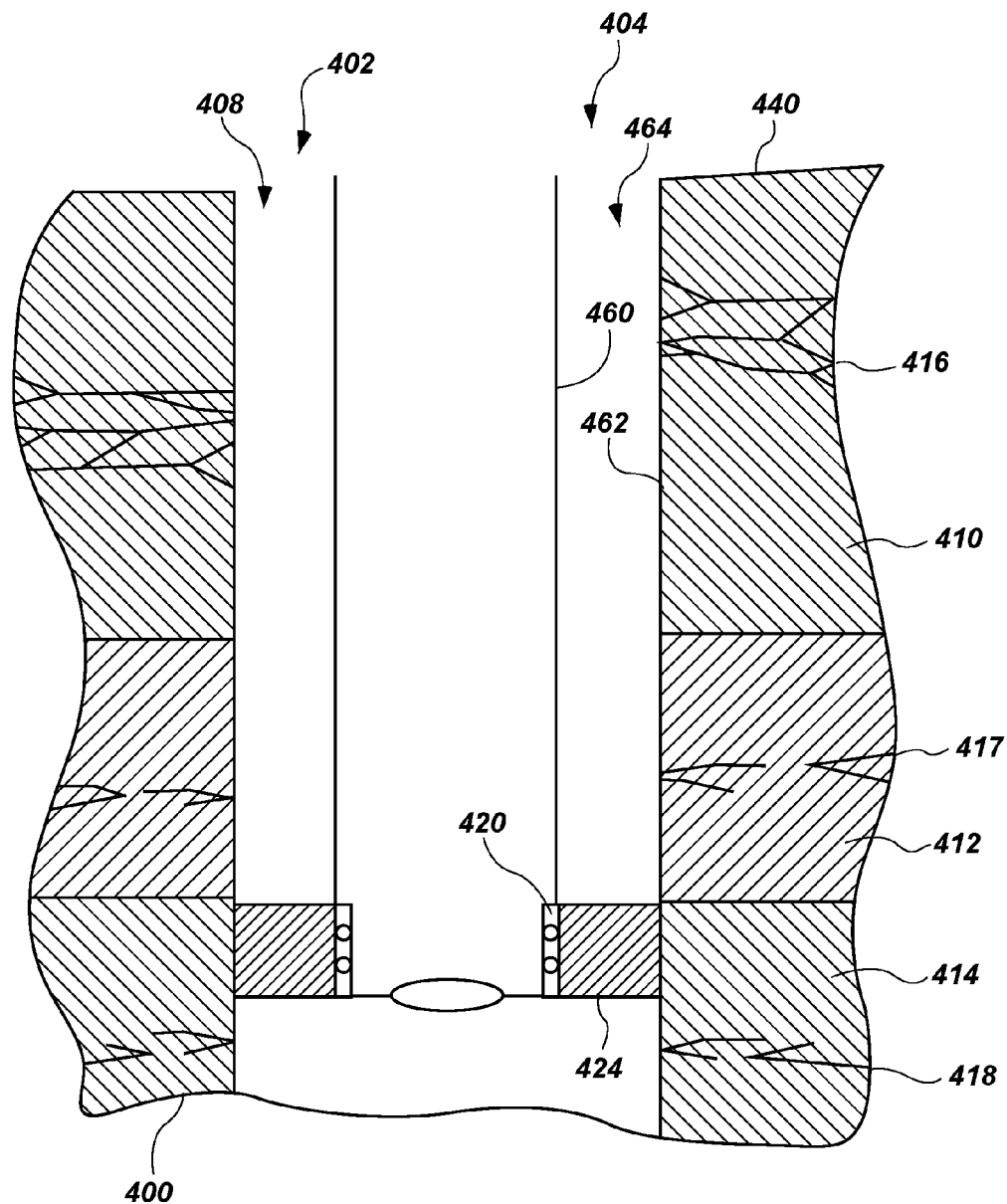
FIGS. 4A through 4B illustrate an exemplary method for maximizing energy recovery from a subterranean formation according to another embodiment.
Figure 4B:
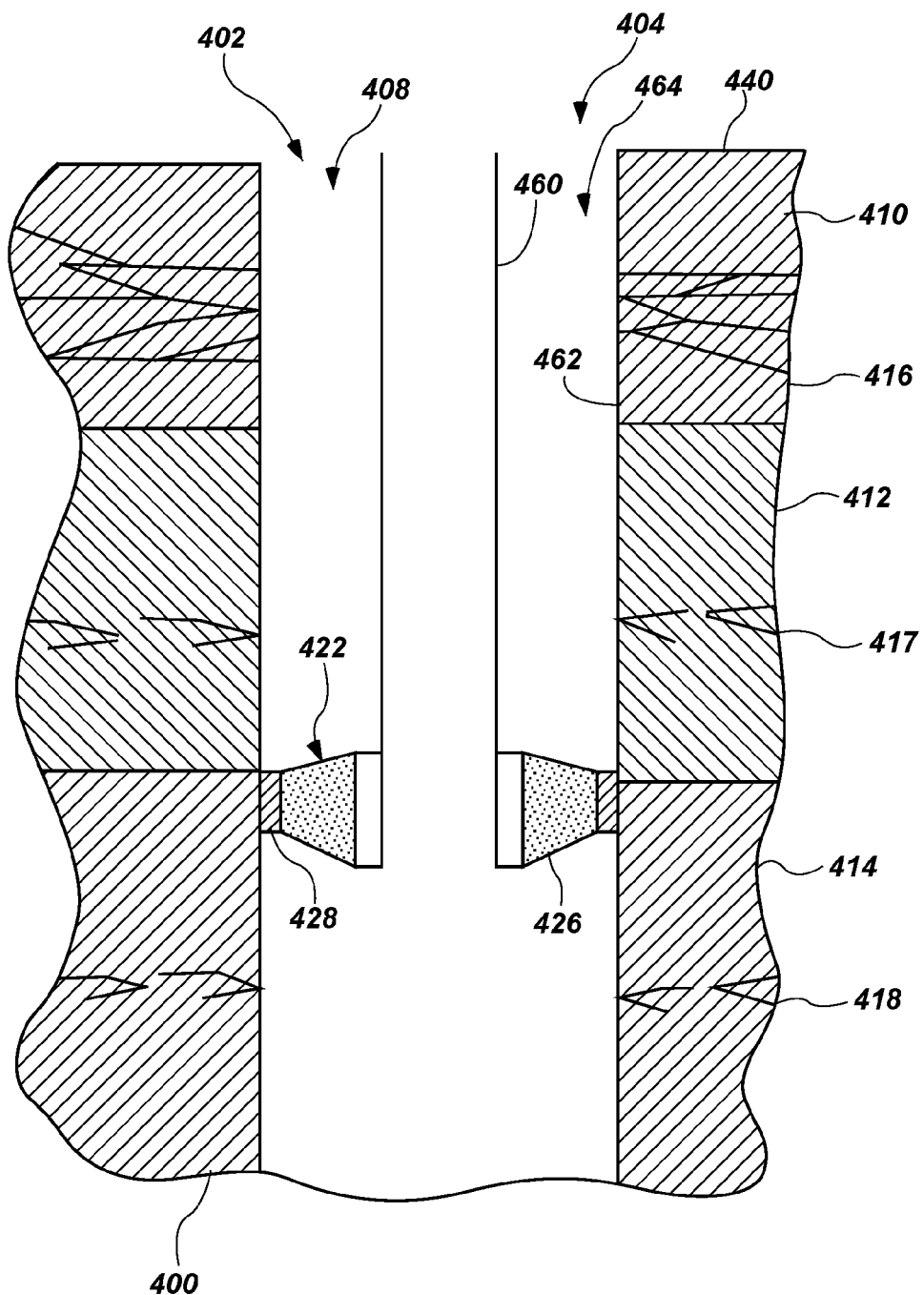

FIGS. 4A through 4B illustrate an exemplary method for maximizing energy recovery from a subterranean formation 400 according to another embodiment. A subterranean well 402 including a wellbore 404 is drilled in a subterranean formation 400. An open-hole section 408 of the subterranean well 402 includes a plurality of open-hole intervals 410, 412, 414 located at increasing subterranean depths. Treatment fluid is injected or pumped into the wellbore 404 to pressurize the open-hole section 408 of the subterranean well 402. Pressure created by injected treatment fluid stimulates a fracture or a fracture network 416 by opening fractures within an unisolated open-hole interval 410. Treatment fluid may comprise water, brine, or any fluid known in the art that is capable of stimulating fractures and compatible with other fluids in the subterranean well 402. Fractures 416 in an open-hole interval 410 that is closer to the surface 440 typically have lower fracture initiation pressures than fractures 417, 418 in open-hole intervals 412, 414 that are located at greater subterranean depths. Fractures 417, 418 in open-hole intervals 412, 414 located at greater subterranean depths and having higher fracture initiation pressures may remain unstimulated during stimulation of fractures 416 with lower fracture initiation pressures. To maximize energy recovery from the subterranean formation 400, a high temperature inflatable open-hole packer 420 or a high temperature expandable open-hole packer 422 may be used to isolate a plurality of selected open-hole intervals 412, 414 for fracture stimulation. A high temperature inflatable open-hole packer 420 or a high temperature expandable open-hole packer 422 may also be used to isolate a plurality of selected open-hole intervals for fracture stimulation before any fracture stimulation occurs.

Referring to FIG. 4A, a high temperature inflatable open-hole packer 420 is deployed into the open-hole section 408 of the subterranean well 402 and positioned adjacent to a selected open-hole interval 414 to isolate the open-hole interval 414 for fracture stimulation. The inflatable open-hole packer 420 includes an inflatable element 424 for engaging the wellbore wall 462 adjacent to the selected open-hole interval 414. The inflatable element 424 is constructed from a high temperature material that will not degrade at temperatures within the subterranean well 402. The inflatable element 424 may be inflated by injecting treatment fluid down a tubing string 460 and into the inflatable element 424 to seal off the annulus 464 between the wellbore wall 462 and the outside diameter of the tubing string 460. The inflatable open-hole packer 420 hydraulically isolates the selected open-hole interval 414 from the remainder of the subterranean well 402 for stimulation of fractures 418 within the isolated open-hole interval 414. Additional treatment fluid may be injected down the tubing string 460 to pressurize the isolated open-hole interval 414. Fluid pressure created by the injected treatment fluid opens unstimulated fractures 418 having higher fracture initiation pressures within the isolated open-hole interval 414 without propagating stimulated fractures 416. Treatment fluid may be injected down the annulus 464 between the outside diameter of the tubing string 460 and the wellbore wall 462 to stimulate fractures 417 within a selected open-hole interval 412 above the isolated open-hole interval 414. Treatment fluid may also be injected simultaneously down the tubing string 460 and the annulus 464 to stimulate fractures 417, 418 within a plurality of open-hole intervals 412, 414 above and below the inflatable open-hole packer 420. The high temperature inflatable open-hole packer 420 may be deflated and retrieved or drilled out, and another high temperature inflatable open-hole packer 420 may be deployed in the subterranean well 402 to isolate another selected open-hole interval for fracture stimulation. A plurality of high temperature inflatable open-hole packers 420 may be deployed in the subterranean well 402 to isolate a plurality of open-hole intervals for fracture stimulation.

Referring to FIG. 4B, a high temperature expandable open-hole packer 422 is deployed into the open-hole section 408 of the subterranean well 402 and positioned adjacent to a selected open-hole interval 414 to isolate the open-hole interval 414 for fracture stimulation. The expandable open-hole packer 422 includes an expandable element 426 and a sealing element 428 for engaging the wellbore wall 462 adjacent to the selected open-hole interval 414. The expandable element 426 may be constructed from a metal such as steel, brass, aluminum or other high temperature material that will not degrade at temperatures within the subterranean well 402. The sealing element may be constructed from a high temperature elastomer including, but not limited to, Viton, Teflon or Kevlar. The expandable element 426 may be hydraulically or mechanically expanded by methods know in the art to engage the sealing element 428 against the wellbore wall 462 adjacent to the selected open-hole interval 414. The expandable open-hole packer 422 hydraulically isolates the selected open-hole interval 414 from the remainder of the subterranean well 402 for stimulation of fractures 418 within the isolated open-hole interval 414. Additional treatment fluid may be injected down the tubing string 460 to pressurize the isolated open-hole interval 414. Fluid pressure created by the injected treatment fluid opens unstimulated fractures 418 having higher fracture initiation pressures within the isolated open-hole interval 414 without propagating stimulated fractures 416. Treatment fluid may be injected down the annulus 464 between the outside diameter of the tubing string 460 and the wellbore wall 462 to stimulate fractures 417 within a selected open-hole interval 412 above the isolated open-hole interval 414. Treatment fluid may also be injected simultaneously down the tubing string 460 and the annulus 464 to stimulate fractures 417, 418 within a plurality of open-hole intervals 412, 414 above and below the expandable open-hole packer 422. After fracture stimulation, the annulus 464 between the outside diameter of the tubing string 460 and the wellbore wall 462 adjacent to the isolated open-hole interval 414 may be filled with cement or sand to maintain hydraulic isolation. The expandable open-hole packer 422 may be retrieved or drilled out, and another expandable open-hole packer 422 may be deployed in the subterranean well 402 to isolate another selected open-hole interval for fracture stimulation. A plurality of high temperature expandable open-hole packers 422 may be deployed in the subterranean well 402 to isolate a plurality of open-hole intervals for fracture stimulation.

Figure 5A:
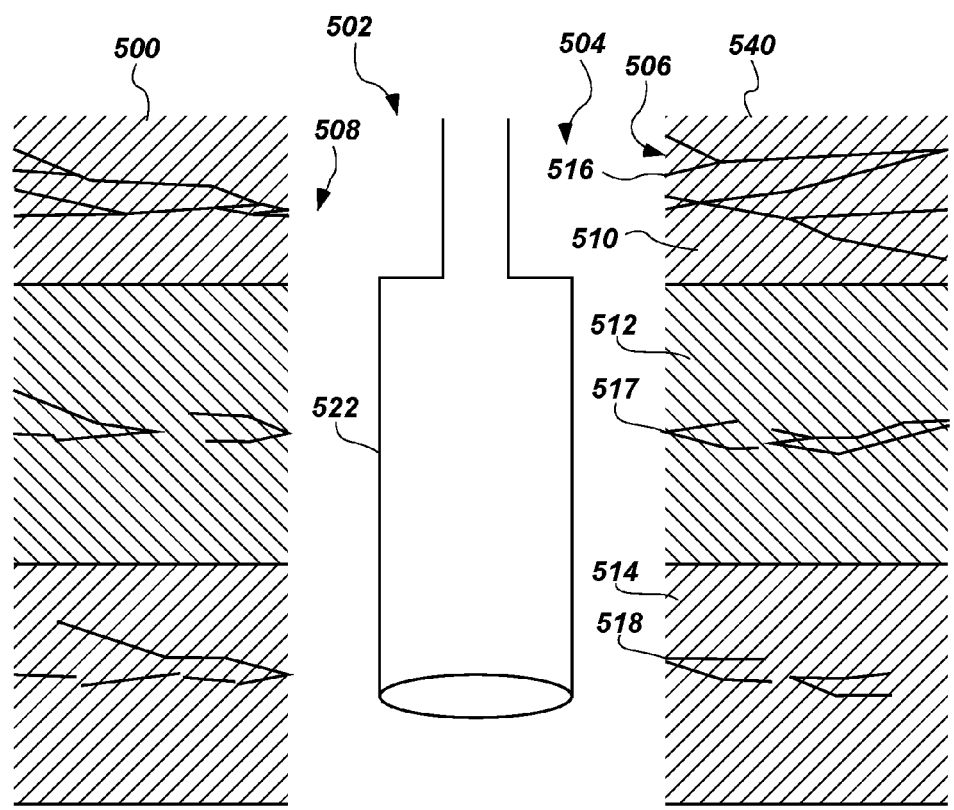
FIGS. 5A through 5E illustrate an exemplary method for maximizing energy recovery from a subterranean formation according to another embodiment.

FIGS. 5A through 5D illustrate an exemplary method for maximizing energy recovery from a subterranean formation 500 according to another embodiment. Referring to FIG. 5A, a subterranean well 502 including a wellbore 504 is drilled in a subterranean formation 500. An open-hole section 508 of the subterranean well 502 includes a plurality of open-hole intervals 510, 512, 514 located at increasing subterranean depths. Treatment fluid is injected or pumped into the wellbore 504 to pressurize the open-hole section 508 of the subterranean well 502. Pressure created by injected treatment fluid stimulates a fracture or a fracture network 516 by opening fractures within an unisolated open-hole interval 510. Treatment fluid may comprise water, brine, or any fluid known in the art that is capable of stimulating fractures and compatible with other fluids in the subterranean well 502. Fractures 516 in an open-hole interval 510 that is closer to the surface 540 typically have lower fracture initiation pressures than fractures 517, 518 in open-hole intervals 512, 514 that are located at greater subterranean depths. Fractures 517, 518 in open-hole intervals 512, 514 located at greater subterranean depths and having higher fracture initiation pressures may remain unstimulated during stimulation of fractures 516 with lower fracture initiation pressures. To maximize energy recovery from the subterranean formation 500, a scab liner 522 may be deployed in the subterranean well 502 and positioned proximate a selected open-hole interval 510 to hydraulically isolate the selected open-hole intervals 510 for fracture stimulation. It is advantageous to isolate selected open-hole intervals with a scab liner 522, because a longer portion of the open-hole section 508 can be isolated and the probability of fractures propagating beyond the isolated interval is reduced. A scab liner 522 may also be used to isolate a plurality of selected open-hole intervals for fracture stimulation before any fracture stimulation occurs.

Figure 5B:
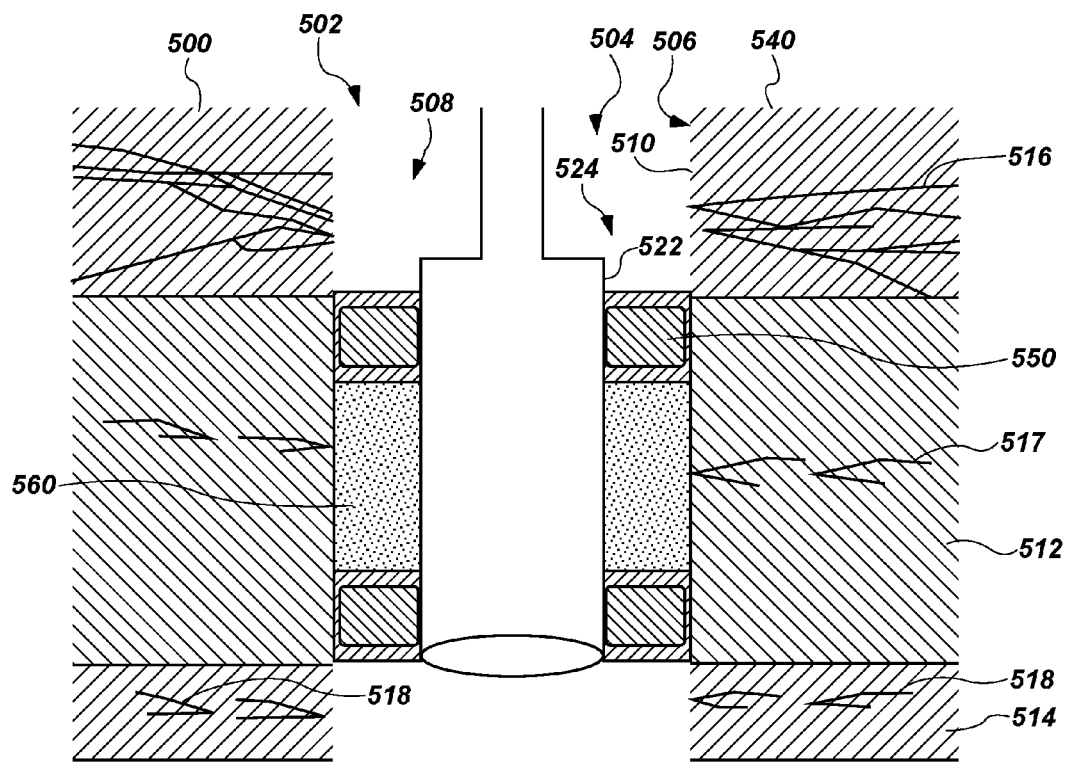

Referring to FIG. 5B, the scab liner 522 may be constructed from conventional well casing and secured in the open-hole section 508 of the subterranean well 502 by pumping cement 560 in an annulus 524 between the wellbore wall 506 and the outside diameter of the scab liner 522. The scab liner 522 may also be secured in the open-hole section 508 of the subterranean well 502 by other ways know in the art including, but not limited to, securing the scab liner 522 with a sealant such as Portland cement and/or positioning an expandable casing packer 550 in the annulus 524 between the wellbore wall 506 and the outside diameter of the scab liner 522.

Figure 5C:
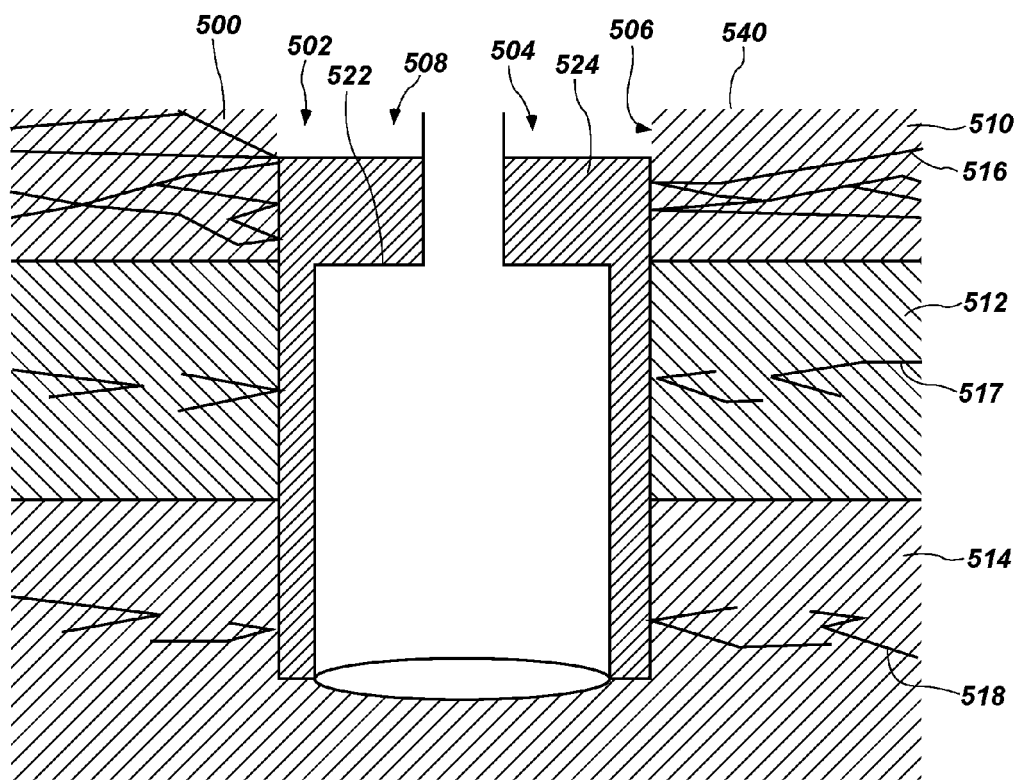

Referring to FIG. 5C, the scab liner 522 may also be constructed from expandable casing and secured in the open-hole section 508 of the subterranean well 502 by pumping cement down the annulus 524 and diametrically expanding the scab liner 522 with mechanical forces, hydraulic forces or by using other expandable casing techniques before the cement sets. A high temperature elastomeric seal may also be provided along the outside diameter of the scab liner 522 to provide a seal the annulus between the wellbore wall 506 and the scab liner 522 after the scab liner 522 is diametrically expanded. A combination of both cement and expandable elastomers may also be used to achieve a hydraulic seal in the annulus.

Figure 5D:
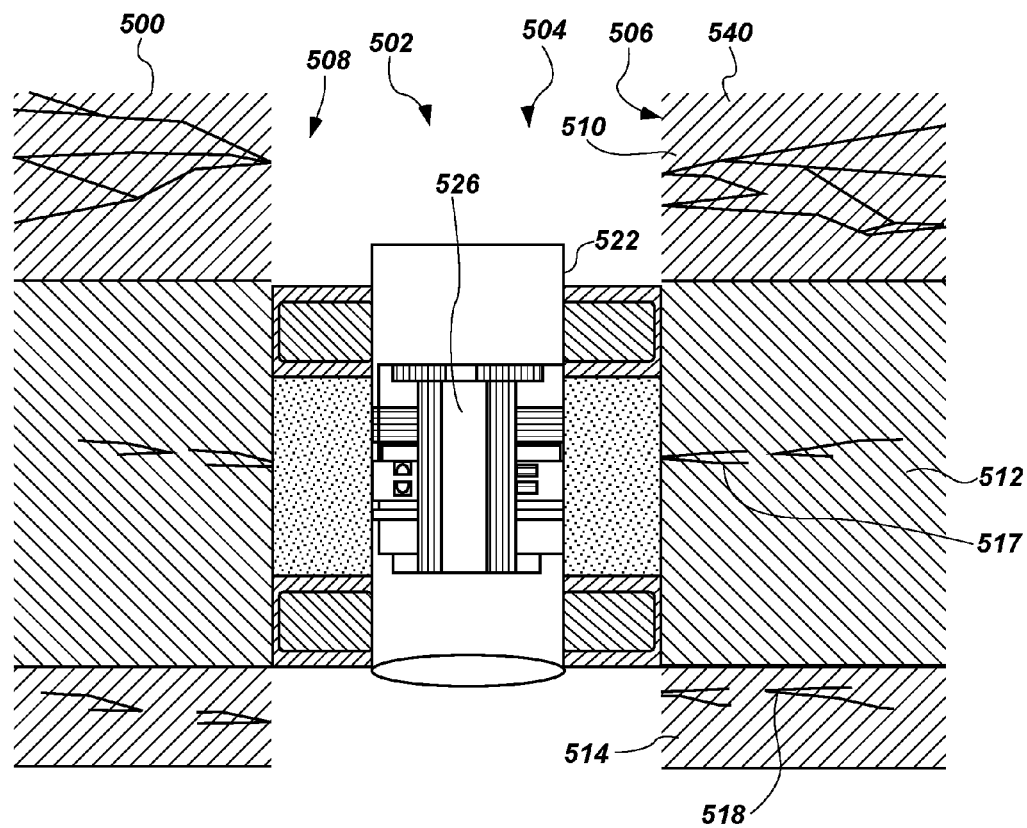

Referring to FIG. 5D, a polished bore receptacle 526 may be installed inside the scab liner 522 adjacent to a selected open-hole interval 514 to provide hydraulic isolation within the scab liner 522 and to hydraulically isolate the selected open-hole interval 514. An internal well packer or other internal plugging device may also be installed within the scab liner 522 adjacent to the selected open-hole interval 514 to provide hydraulic isolation within the scab liner 522 and to hydraulically isolate the selected open-hole interval 514 from the remainder of the subterranean well 502.

Figure 5E:
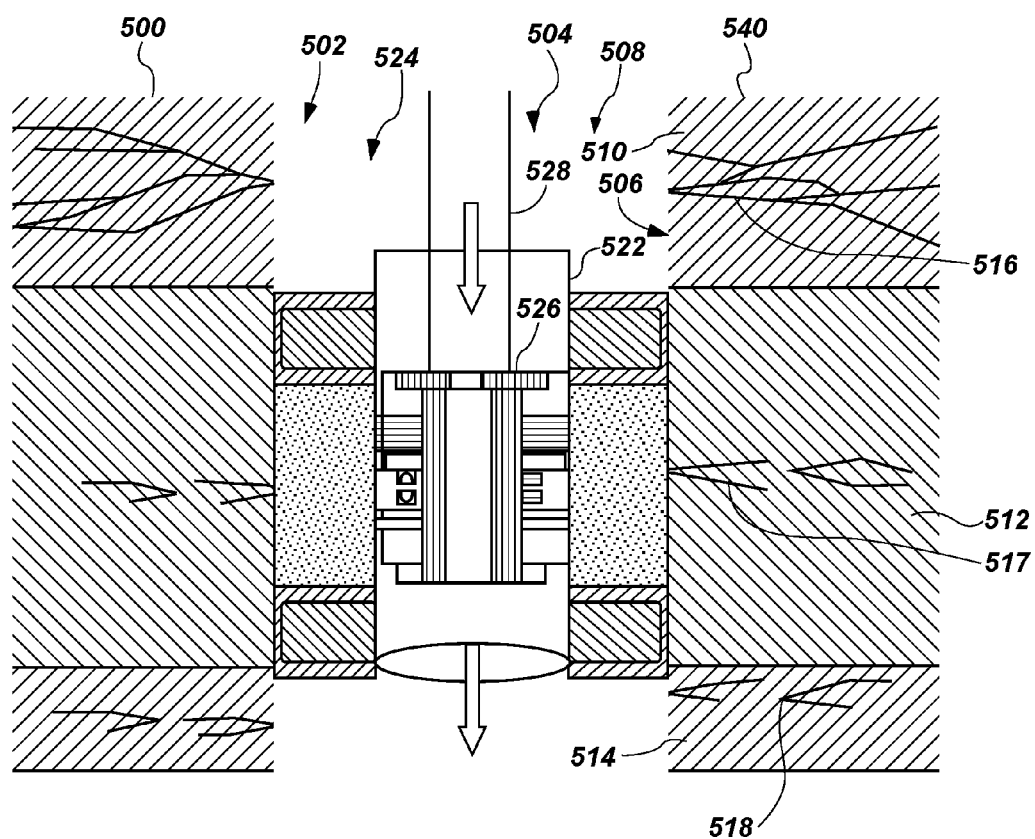

Referring to FIG. 5E, a tubing string 528 is stabbed through the polished bore receptacle 526. Treatment fluid is injected below the scab liner 522 to pressurize the isolated open-hole interval 508 and stimulate fractures 518 within the isolated open-hole interval 514. If an internal well packer or other internal plugging device is installed in the scab liner 522 the tubing string 528 may be stabbed through the internal well packer or internal plugging device to allow injection of treatment fluid into the isolated open-hole interval 514. Fluid pressure opens unstimulated fractures 518 within the isolated open-hole interval 514 without propagating stimulated fractures 516. Treatment fluid may be injected down the annulus 524 between the tubing string 528 and the wellbore wall 506 to stimulate fractures within selected open-hole intervals above the scab liner 522. Treatment fluid may also be injected simultaneously and/or independently down the tubing string 528 and the annulus 524 to stimulate fractures in a plurality of open-hole intervals above and below the scab liner 522. After stimulation of fractures 518 within the isolated open-hole interval 514, the tubing string 528 is raised from within the scab liner 522 and a temporary plug is installed below the polished bore receptacle 526 to seal off the isolated open-hole interval 514. The temporary plug may be a "NO-GO" or other plug known in the art for internally plugging scab liners.

A plurality of scab liners may be deployed in the subterranean well 502 and positioned proximate a plurality of selected open-hole intervals to hydraulically isolate the selected open-hole intervals for fracture stimulation. A polished bore receptacle, packer or other internal plugging device is installed inside the scab liner adjacent to a selected open-hole interval to provide hydraulic isolation within the scab liner and to hydraulically isolate the selected open-hole interval from the remainder of the subterranean well 502. The tubing string 528 is stabbed through the polished bore receptacle and treatment fluid is injected down the tubing string 528 or the annulus 524 to stimulate fractures within open-hole intervals above and/or below the scab liner 522 without propagating stimulated fractures. After stimulation of fractures within a plurality of open-hole intervals, a temporary plug may be installed below the polished bore receptacle to seal off the isolated open-hole interval. Temporary plugs such as "NO-GO" plugs installed below one or more polished bore receptacles in one or more scab liners may be retrieved with a wire line, a coiled tubing rig or conventional drill pipe and a drill rig to maximize energy recovery from a plurality of open-hole intervals after fracture stimulation is complete.

In accordance with the present disclosure, the methods herein disclosed for isolating an open-hole interval including the injection of a temporary fracture sealant, the injection of a high viscosity fluid, the use of high pressure jet nozzles, the deployment of an open-hole packer and the deployment of a scab liner may be used alone or in combination to isolate one or more selected open-hole intervals for fracture stimulation.

During fracture stimulation, a micro-seismic monitoring system may be installed to detect the location of micro-fractures real-time as they are stimulated during fracture stimulation. A fiber optic temperature and/or pressure monitoring system may also be installed to provide temperature and pressure data for determining downhole parameters real-time during stimulation. These detection systems are used to determine downhole parameters including, but not limited to, the propagation of fractures, the pressure within the subterranean well, the temperature within the subterranean well, the flow rate and flow pattern of treatment fluid in the subterranean well and the flow rate and flow pattern of treatment fluid within fractures in the subterranean formation.

Example embodiments have been described hereinabove regarding improved systems and methods for maximizing energy recovery from a subterranean formation. Various modifications to and departures from the disclosed example embodiments will occur to those having ordinary skill in the art. The subject matter that is intended to be within the spirit of this disclosure is set forth in the following claims.

What is claimed is:

1. A method for recovering thermal energy from a subterranean formation comprising:
   pressurizing at least one unstimulated fracture within an unisolated subterranean open-hole interval to create a first stimulated fracture;
   isolating a selected subterranean open-hole interval by blocking the first stimulated fracture with a temporary fracture sealant, wherein the temporary fracture sealant thermally degrades at geostatic temperatures; and
   pressurizing at least one unstimulated fracture within the isolated subterranean open-hole interval to create a second stimulated fracture, wherein a water is circulated within the second stimulated fracture to be heated and produced from the well for generating electricity.

2. The method as recited in claim 1, wherein isolating the selected subterranean open-hole interval comprises positioning an isolation tool adjacent to the selected subterranean open-hole interval.

3. The method as recited in claim 2, wherein pressurizing the at least one unstimulated fracture within the isolated subterranean open-hole interval comprises injecting a treatment fluid down a tubing string.

4. The method as recited in claim 3, further comprising pressurizing the at least one unstimulated fracture in the unisolated subterranean open-hole interval by injecting the treatment fluid down an annulus between the tubing string and the unisolated subterranean open-hole interval.

5. The method as recited in claim 4, wherein the isolation tool is a high temperature inflatable open-hole packer.

6. The method as recited in claim 4, wherein the isolation tool is a high temperature expandable open-hole packer comprising an expandable element and a sealing element.

7. The method as recited in claim 1, wherein isolating the selected subterranean open-hole interval comprises positioning a scab liner proximate the selected subterranean open-hole interval.

8. The method as recited in claim 7, wherein pressurizing the at least one unstimulated fracture within the isolated subterranean open-hole interval comprises injecting a treatment fluid down a tubing string.

9. The method as recited in claim 8, further comprising pressurizing the at least one unstimulated fracture in the unisolated subterranean open-hole interval by injecting the treatment fluid down an annulus between the tubing string and the unisolated subterranean open-hole interval.

10. The method as recited in claim 1, wherein pressurizing the at least one unstimulated fracture in the isolated subterranean open-hole interval comprises projecting treatment fluid from a high pressure jet nozzle against the isolated subterranean open-hole interval.

11. The method as recited in claim 10, wherein the treatment fluid comprises a granular material.

12. The method as recited in claim 1, wherein isolating the selected subterranean open-hole interval comprises at least partially filling at least one fracture in the unisolated subterranean open-hole interval with a high viscosity fluid.

13. The method as recited in claim 1, further comprising detecting a stimulation of fractures real-time with a micro-seismic monitoring system.

14. The method as recited in claim 1, further comprising detecting a downhole parameter realtime.

15. The method as recited in claim 14, wherein the downhole parameter is at least one of pressure of the selected open-hole interval, temperature of the selected open-hole interval, the flow rate of the treatment fluid in the selected open-hole interval, the flow pattern of treatment fluid in the selected open-hole interval, the flow rate of the treatment fluid in a fracture in the selected open-hole interval and the flow pattern of the treatment fluid in a fracture in the selected open-hole interval.

\* \* \* \* \*